United States Patent [19]
Landy

[11] 3,870,490
[45] Mar. 11, 1975

[54] FILTER AND SEAL
[76] Inventor: Jerome J. Landy, 13700 S.W. 78th Ct., Miami, Fla. 32158
[22] Filed: Apr. 29, 1974
[21] Appl. No.: 464,816

[52] U.S. Cl................... 55/355, 55/473, 55/502, 277/135, 277/207
[51] Int. Cl............................................. B01d 31/00
[58] Field of Search................. 55/355, 473, 502; 49/303–305, 475, 477; 285/10; 277/135, 207; 161/121, 123

[56] References Cited
UNITED STATES PATENTS

| | | | |
|---|---|---|---|
| 2,771,156 | 11/1956 | Kasten et al. | 55/502 |
| 3,032,062 | 5/1962 | Blahnik | 277/211 |
| 3,470,679 | 10/1969 | Ramsey | 55/502 |
| 3,529,406 | 9/1970 | Allan, Jr. et al. | 55/502 |
| 3,647,229 | 3/1972 | Grimes | 277/207 |
| 3,712,631 | 1/1973 | Forchini et al. | 277/207 |

*Primary Examiner*—Bernard Nozick
*Attorney, Agent, or Firm*—Dominik, Knechtel, Godula & Demeur

[57] ABSTRACT

A filter and seal is disclosed in which a filter having a labyrinth like complex of filter media is surrounded by a generally rectangular frame. Secured to the marginal edges of the frame and extending from said edges is a gasket formed of a generally cellular compressable material, the outer reaches of which have a plurality of tongues and grooves. The tongues and grooves are filled with an inert stable grease, and then the filter unit is clampingly engaged between opposed seal support members which serve the two-fold purpose of locking the filter in place, and compressing the tongues and the inert stable grease to thereby effect a substantially impervious seal to microorganisms of the character which are commonly filtered by such a medium.

9 Claims, 7 Drawing Figures

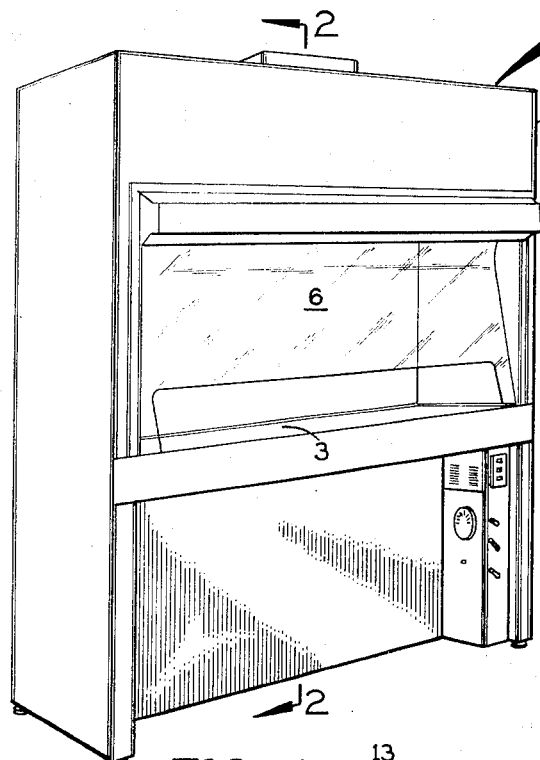
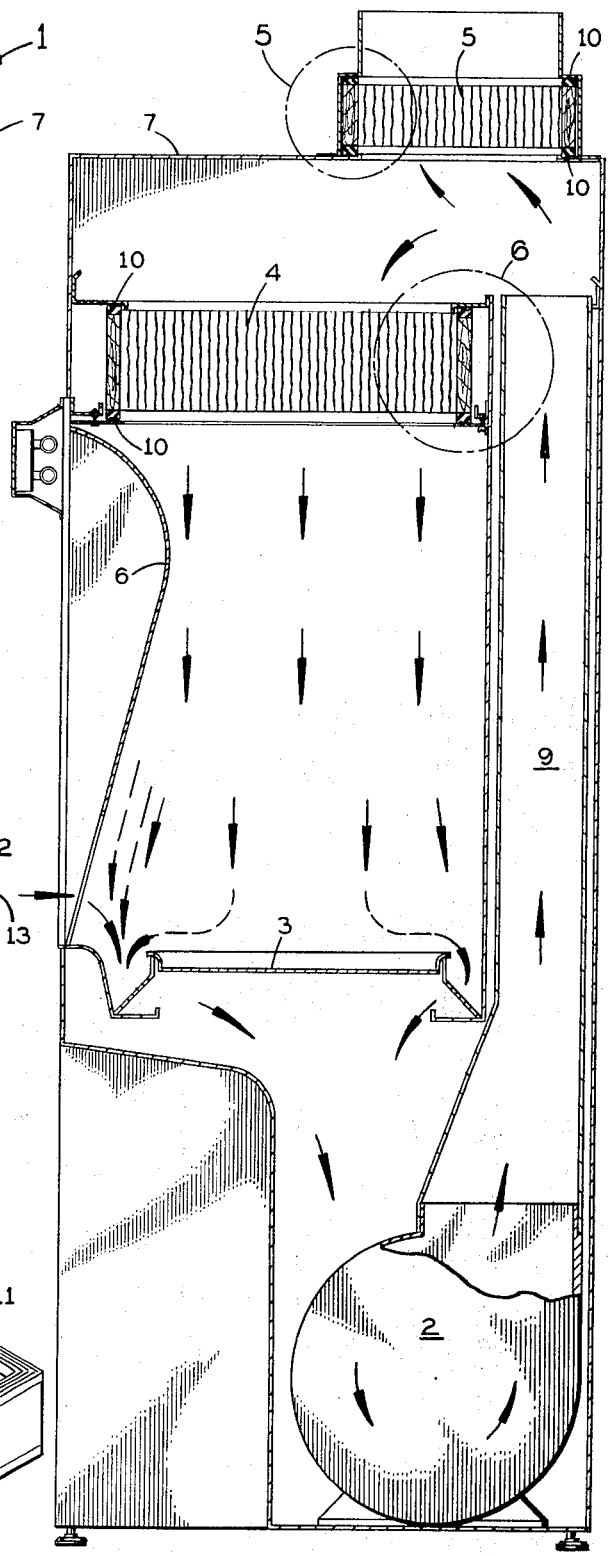
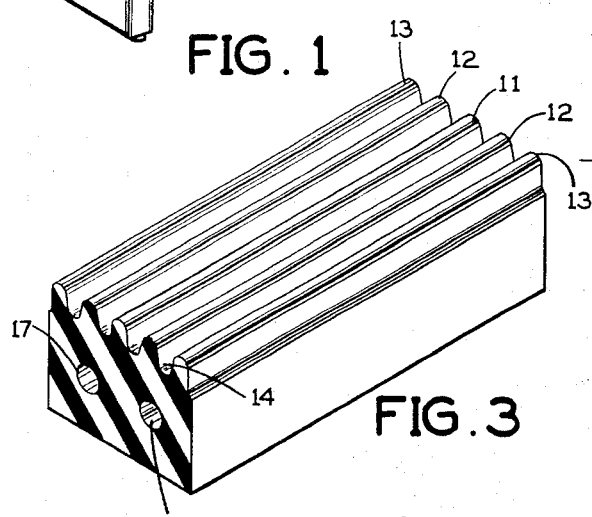
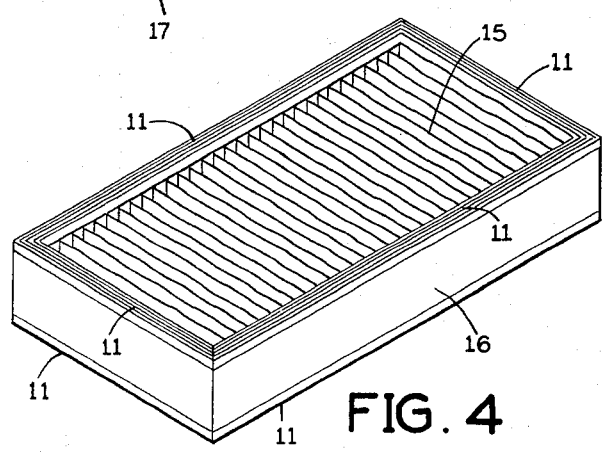

FILTER AND SEAL

BACKGROUND OF THE INVENTION

1. Field of the Invention

The invention relates to a filter and seals, and more particularly that type of filter-seal relationship employed in the handling of biohazardous material. Such seals may be found classified in the United States Patent Office Class 55, sub-class 355, and elsewhere through the patent literature. Such a seal finds particular utility in United States patent application Ser. No. 326,608 filed Jan. 26, 1973, entitled "Cabinet for Biohazardous Materials" and equipment of this character.

2. Description of the Prior Art

The patent literature is exemplified by U.S. Pat. No. 3,486,311 and 3,529,406 where representative "HEPA" are employed. These filters have a very high efficiency, and can filter out microorganisms and particles with 0.3 micron size, allegedly with a 99.97% efficiency. The filter, however, is no stronger or no more effective than the seal which directs all of the hazardous air through the filter for purposes of filtering. The same quite logically applies to a balloon which is no more effective in holding air than the largest pinhole. Accordingly, it is desirable to provide a seal around the filter in such a manner that no microorganisms will pass through the sealing medium, and all of the microorganisms will pass through the "HEPA" filter and be appropriately filtered by such transmission.

In the device shown in the above referenced patent literature in U.S. Pat. No. 3,486,311, it will be seen that a channel type affair is employed, and as illustrated in FIG. 2 of the drawings, a liquid is placed in the channel. The obvious disadvantage of such a filter seal is the requirement that the channel be filled at the location of the instrument, and cannot be filled in the factory since, when the same is shipped throughout the country, or even moved for purposes of installation, the fluid will spill. Similarly, in U.S. Pat. No. 3,529,406, it will be noted that hydrocarbons for purposes of filling as a lubricant are disclosed, being referenced in FIG. 2 of that patent by the number "14" and defined as "a fluid 14 having a high consistency at room temperature and which, when melted, may be easily poured into the groove."

A chief problem with many of the other gaskets which are employed as a seal with a filter, in addition to the problem induced by fluids or solids of mixtures thereof which can be spilled, or displaced to a dry channel which can leak are that the gaskets may lose their memory and leaks develop, or they may be damaged in transit. Furthermore, when such units do arrive at the laboratory or research facility with damage to the seal, oftentimes the laboratories do not have the materials available to test for leakage, the materials available to repair the leakage, and most importantly, the necessary human skills available to both determine the leakage and secure the unit against it. Furthermore, some of the biohazardous cabinets which are currently being manufactured have filters which are over seventy inches in length. Necessarily, both the filter frame construction will have dimensional inconsistencies throughout that length, as well as the filter frame support. It is, therefore, highly desirable that the undulations be accommodated by any seal.

SUMMARY OF INVENTION

The present invention is directed to a seal and a filter, and more particularly a HEPA type filter, in which the seal is provided at the marginal edges of a generally rectangular filter. The seal is formed by means of preferably a closed cell neoprene extrusion having a plurality of tongues and grooves on one face, opposed by a flat face, the latter face being secured to the frame of the filter. While the description and discussion relates to a filter having generally rectilinear edges, it will be appreciated that curvilinear edges can be effectively sealed with the same type of seal. The sealing medium includes the coaction of a plurality of tongues and grooves, along with an inert stable non-degradable grease, preferably a silicone derivative. The grease is applied between the tongues and grooves of the gasket member, and (after the opposing face of the gasket member has been secured to the marginal edges of the frame of the filter by means of a surface cement) the same is compressively engaged with a seal support in whatever unit the filter is to be employed. The compression is not necessarily essential to the seal, but a thorough wetting of the gasket between its tongues and grooves, and the adjacent support is essential to such a seal, and the permanence of the seal along with its resistance to vibration, undulations in the plenarty of both the filter and the support, and other variables which are not designed but which are the necessary hazards of handling any product.

In view of the foregoing, it is a principal object of the present invention to provide a filter and seal which is thoroughly effective, relatively inexpensive to apply, and resistant to the normal hazards of shipment, and breakage attendant to the transport and assembly of a biohazardous materials handling cabinet and related equipment.

Still another object of the present invention is to provide a filter and seal which can be applied to filters stored in reserve, and which will have relatively long and stable shelf life.

Yet another object of the present invention looks to the provision of a filter and seal which can, along with its associated filter, be readily installed by technicians in the field in an existing cabinet where a leak may have been detected, or where the filter is being replaced as a matter of routine maintenance and those precautionary disciplines attendant to the handling of biohazardous materials.

Still another and more detailed object of the present invention is to provide a filter and seal which is readily adaptable to a wide variety of filter sizes, proportions, and most importantly several variations in the filter support and seal support which will be located in the host equipment in which the filter is employed.

DESCRIPTION OF DRAWINGS

Further objects and advantages of the present invention will become apparent as the following description of an illustrative embodiment proceeds, taken in conjunction with the accompanying drawings in which:

FIG. 1 illustrates in perspective a typical illustrative biohazardous materials handling cabinet in which the subject filter seal may be employed.

FIG. 2 is a vertical cross-sectional view through the biohazardous materials cabinet shown in FIG. 1 taken along section line 2—2 of FIG. 1, but shown in enlarged scale and diagrammatically indicating the air flow which takes place interiorly of the cabinet, and the position and orientation of illustrative makeup air and recirculating air filter, and exhaust filter.

FIG. 3 is a perspective view, cut away at the end, of the gasket material employed in the subject seal.

FIG. 4 is a perspective view of a typical filter with the gasket material applied to the frame edges illustrative of the invention.

DESCRIPTION OF PREFERRED EMBODIMENT

Figure 5:
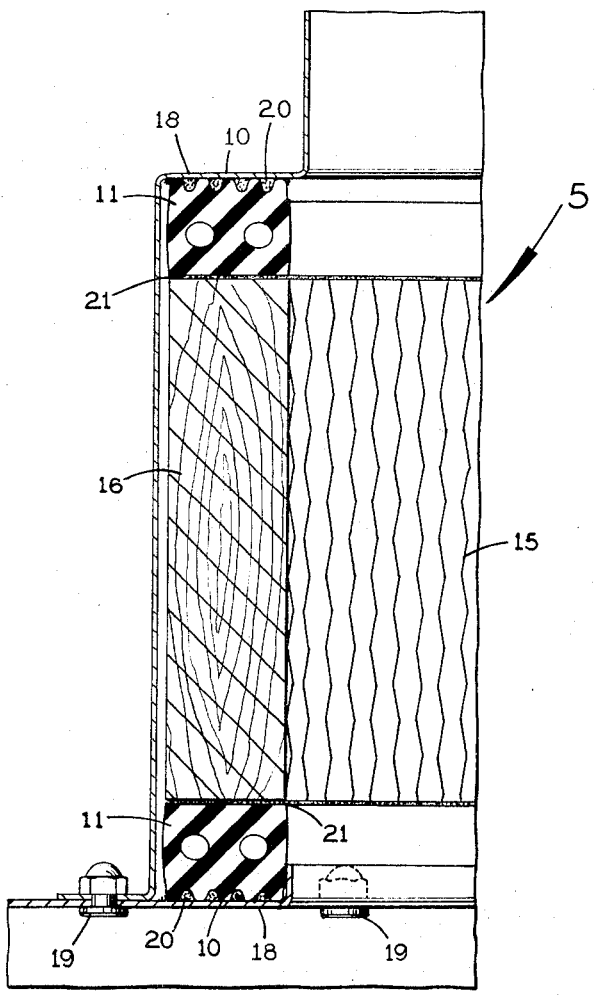
FIG. 5 is an enlarged sectional view taken generally in the area designated in phantom lines by the number 5 at the upper portion of FIG. 2.

The present invention finds significant utility in a biohazardous materials handling cabinet, such as illustrated as cabinet 1 of FIG. 1 of the drawings. The specific details of such a cabinet are shown in co-pending U.S. Pat. application Ser. No. 326,608 filed Jan. 26, 1973.

For purposes of understanding the utility of the invention, however, it will be seen that the biohazardous materials handling cabinet 1, has a viewing panel 6 in its forward portion, the lower portion of which defines an opening giving access to a work tray 3. The cabinet 1 includes a generally closed tube housing 7 and a plenum chamber 9 at the rear portion thereof which is fed by a blower 2. The blower 2 recirculates air throughout the interior portion of the closed tube housing 7, a portion of which exhausts to the ambient environment through the exhaust filter 5, the balance of which passes through the recirculating and supply filter 4 back atop the work table 3 and vents downwardly into the blower 2 for recirculation again. The general flow of the air is illustrated in FIG. 2, and more particularly the makeup air which comes through the lower portion of the viewing panel 6 as shown by the curved arrows at the left-hand portion of the work tray 3.

The invention is, of course, directed to the filter and its seal 10 at the marginal edges of both the recirculating and supply filter 4 as well as the exhaust filter 5. The principal, although not only, element of the seal 10 is the gasket 11, shown in cross section in FIG. 3. Preferably, the gasket 11 is extruded from a closed cell neoprene extrusion, a useful commercial embodiment being supplied by the Rubatex Company of Bedford, Virginia. As noted in FIG. 3, the gasket 11 has a plurality of tongues 12, two lateral tongues 13, and grooves 14 defined between the tongues 12, 13. In addition, the gasket 11 is shown with a pair of relief tubes 17 which are extruded in the body portion to render the same more compressable, and increase the sealing effect as will be hereinafter defined. In one commercial embodiment, the width of the gasket 11 approximates seven-eighths inches, the two relief tubes 17 are one-eighth inch in diameter, and the gasket body is eleven-sixteenths inch high, with the center tongues 12, although curvilinear, being proportioned to conform with an approximate three-thirty-seconds inch square.

The two lateral tongues 13 are also curvilinear, but proportioned to conform to a one-eighth inch square. By having the lateral tongues 13 slightly higher and larger than the interior tongue 12, they serve to additionally stabilize the seal, and retain the sealing medium 20 (particularly as shown diagrammatically in FIG. 7).

The gasket 11 is secured by means of a contact cement 21 (see FIG. 7) to the frame 16 of the filter. When completed, the filter medium 15, which is surrounded by the filter frame 16 as shown in FIG. 4, has a gasket 11 around its entire periphery at the marginal or upper and lower edges thereof. The filters, both the recirculating supply filter 4 and exhaust filter 5, are positioned within a typical cabinet 1 as shown at the upper portion of FIG. 2. More specifically, the exhaust filter 5, as shown in enlarged section in FIG. 5, is positioned in such a fashion that opposed seal supports 18 are provided at the opposed ends of the frame 16 as implemented by the gasket 11. The specific seal 10 is defined at the interface between the seal support 18 and the gasket 11 by means of a combination of the inert stable grease 20, and its wetting action against the support 18, coupled with the sealing engagement of the tongues 12, 13, against the supports 18. In order to insure further sealing, the lower support 18 (as shown in FIG. 5) is secured by means of wing nuts 19 into position so that a compressive or biasing action takes place between the upper seal 10 and the lower seal 10 of the exhaust filter 5.

Figure 6:
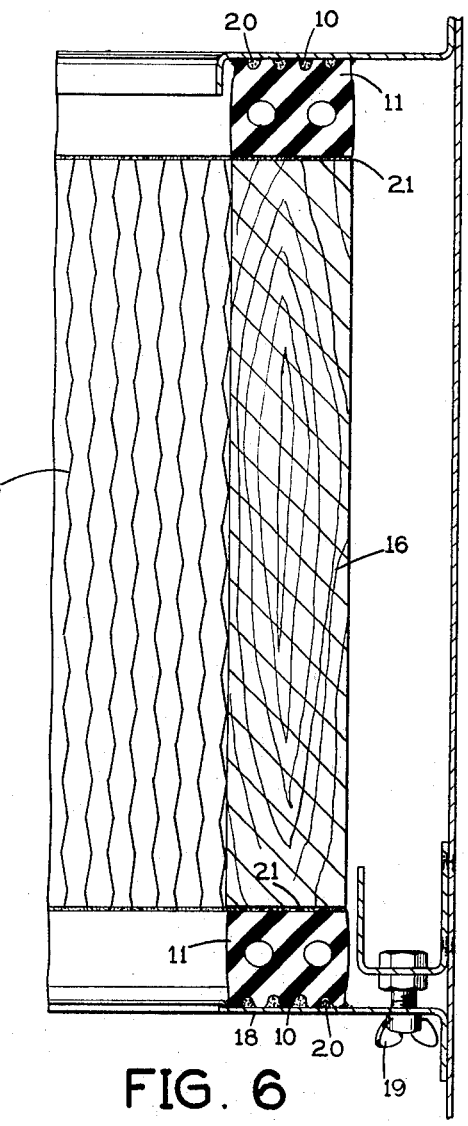
FIG. 6 is an enlarged sectional view of that area shown near the upper portion of FIG. 2 at the right hand side designated in phantom lines by the number 6.

In FIG. 6 there is shown a slightly modified construction for mounting the recirculating supply filter 4 and its associated seal 10 into position by means of wing nuts 19, at the lower portion engaging the lower portion seal support 18. Again, the seal is a function of the tongues 12, 13, atop the gasket 11 securing the inert stable grease 20 between the tongues 12, 13 in the grooves 14, and wetting the interface between the gasket 11 and the supports 18. Sufficient pressure is secured by means of adjusting the wing nuts 19, and this similarly accommodates any undulations in the seal support 18, or the frame 16, so that a compressive engagement is secured along the entire length of the seal 10.

Figure 7:
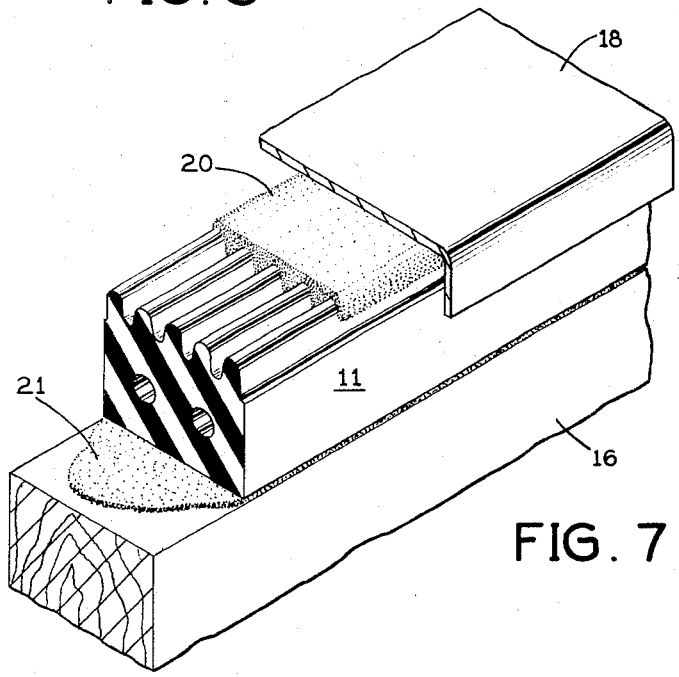
FIG. 7 is a partially diagrammatic cutaway perspective view showing the relationship between the gasket, the sealing medium, support, and the frame of a typical filter.

The contact cement 21, illustrated diagrammatically in FIG. 7, may be selected from any class which will positively adhere the closed cell neoprene gasket 11 to the frame 16 to the extent that when any tearing action takes place, the failure will be in the body of the gasket 11, and not at the interface between the frame 16 and the lower portion of the gasket 11. Such a glue, in addition, should be relatively inert, stable to a wide variety of temperature and moisture conditions, and not subjected to vibrational disengagement.

Similarly, the inert stable grease should be selected from that class of inert greases which are stable at various temperatures, inert with regard to attacking both neoprene as well as metal, and have a long consistent shelf life. A highly desirable silicone grease is tht manufactured by the Dow Corning Company which is a silicone lubricating and sealing compound, identified as DC111, and works ideally in connection with application to the tongue and groove portion of the gasket 11 between temperatures of $-40°$ F to $+500°$ F. Indeed, the grease can be applied to the filters between the tongues 12, 13 of the gasket 11 and a piece of paper or other sealing material applied therealong and insure that the filter will have long shelf life, and also facilitate prompt installation for placement in biohazardous cabinets, as illustrated, by a quick removal of the wing or cap nuts 19, and the seal supports 18, reinsertion of the filters 4, 5 and replacement by storing the wing of cap nuts 19 to their original position and tightening the same until compressive engagement is achieved throughout the entire length of the gasket 11.

Thus, it will be seen that a filter and seal has been disclosed and described which works particularly well with a HEPA type filter, and overcomes the major problems of obtaining a suitable seal which is readily replaceable. The seal illustrated employs a gasket 11 which, because of a plurality of tongues 12, 13, is inherently insured against losing its memory and allowing bypass. Furthermore, the sealing material is sufficiently viscous, when combined with the labyrinth defined by the tongues 12, 13, that the same will be maintained in place and not migrate away from the interface between the gasket 11 and the seal support 18. Therefore, channeling, whether occurring in operation or transport, is avoided with the seal 10 illustrative of the present invention, and a highly reliable seal is insured which works in combination with the HEPA filter to maintain the HEPA filter's very high efficiency rate of 99.97% or better.

Although particular embodiments of the invention have been shown and described in full here, there is no intention to thereby limit the invention to the details of such embodiments. On the contrary, the invention is to cover all modifications, alternatives, embodiments, usages and equivalents of a filter seal as fall within the spirit and scope of the invention, specification and the appended claims.

What is claimed is:

1. A filter and seal, said filter having a frame periphery with marginal edges to be secured to a support, said seal comprising, in combination:

a gasket body of resilient material, a plurality of tongues on one face of said gasket body, a plurality of grooves defined between said tongues on said gasket body, means for securing said gasket body in sealed adhesive relationship to the filter frame, and a sealant of inert stable grease-like material in the grooves defined between said tongues, whereby, upon compressing the gasket members against the sealant in compressive relationship to the support means for holding the filter, a seal is defined between the interface of the tongues of the gasket and the support means which is wetted by the sealant.

2. The filter and seal of claim 1, further including at least three tongues, the outer of said tongues being larger than the inner of said tongues to define a more complete seal at the exterior portions of the gasket to retain the sealant therebetween.

3. The filter and seal of claim 1, said gasket material being formed of a closed cellular neoprene material.

4. The filter and seal of claim 3, pressure clamping means for securing the support means against the wetted interface between the gasket tongues and the support member.

5. The filter and seal of claim 1, pressure clamping means cooperating with said support means to permit the installation of the seal and its associated filter with a compressive relationship between the gasket body and the support means wetted by the interface between the tongues and face of the support.

6. The filter and seal of claim 1, further including said tongues comprising five tongues, said five tongues defining therebetween four grooves, the outer two of said tongues being larger than the inner three of said tongues, whereby the outer tongues more effectively seal the sealant therebetween in the grooves thus defined.

7. The filter and seal of claim 6, pressure clamping means for securing the support means against the wetted interface between the gasket tongues and the support member.

8. The filter and seal of claim 1, wherein said sealant is a silicone grease of a non-fluid, non-pouring consistency at ambient room temperature.

9. The filter and seal of claim 8, wherein the body of said gasket has at least one relief tube in the interior portion thereof to provide for additional flexibility.

* * * * *